US012629815B2

(12) United States Patent
Shibata

(10) Patent No.: US 12,629,815 B2
(45) Date of Patent: May 19, 2026

(54) SUBSTRATE CONVEYOR ROBOT AND SUBSTRATE CONVEYING APPARATUS

(71) Applicant: KAWASAKI JUKOGYO KABUSHIKI KAISHA, Kobe (JP)

(72) Inventor: Takeshi Shibata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 417 days.

(21) Appl. No.: 18/554,009

(22) PCT Filed: Apr. 6, 2022

(86) PCT No.: PCT/JP2022/017152
§ 371 (c)(1),
(2) Date: Oct. 5, 2023

(87) PCT Pub. No.: WO2022/215702
PCT Pub. Date: Oct. 13, 2022

(65) Prior Publication Data
US 2024/0116171 A1 Apr. 11, 2024

(30) Foreign Application Priority Data

Apr. 9, 2021 (JP) ................................. 2021-066625

(51) Int. Cl.
*B25J 9/00* (2006.01)
*B25J 9/06* (2006.01)
*B25J 9/10* (2006.01)
(52) U.S. Cl.
CPC .............. *B25J 9/0093* (2013.01); *B25J 9/06* (2013.01); *B25J 9/106* (2013.01)

(58) Field of Classification Search
CPC ... B25J 9/0093; B25J 9/06; B25J 9/106; B25J 9/042; B25J 18/04; H01L 21/677
See application file for complete search history.

(56) References Cited

U.S. PATENT DOCUMENTS

| | | | | |
|---|---|---|---|---|
| 2015/0128441 A1* | 5/2015 | Segawa | ............. | H01L 21/67742 34/523 |
| 2019/0054613 A1* | 2/2019 | Shibata | ...................... | B25J 9/06 |
| 2024/0198514 A1* | 6/2024 | Shibata | .................... | B25J 9/043 |

FOREIGN PATENT DOCUMENTS

| | | | | | |
|---|---|---|---|---|---|
| JP | 2002265011 A | * | 9/2002 | | |
| JP | 2004343140 A | * | 12/2004 | | |
| JP | 2010069552 A | * | 4/2010 | | |
| JP | 2012056033 A | * | 3/2012 | | |
| JP | 2014111310 A | * | 6/2014 | ....... | H01L 21/67766 |
| JP | 2017148925 | * | 8/2017 | | |
| JP | 2017148925 A | * | 8/2017 | ....... | H01L 21/67751 |
| JP | 2018074174 A | * | 5/2018 | | |
| JP | 7610947 | * | 1/2025 | | |
| JP | 7610947 B2 | * | 1/2025 | | |
| TW | 202044393 | * | 12/2020 | | |
| TW | 202044393 A | * | 12/2020 | ....... | H01L 21/68707 |

* cited by examiner

*Primary Examiner* — Jacob S. Scott
*Assistant Examiner* — Erin Morris
(74) *Attorney, Agent, or Firm* — Oliff PLC

(57) ABSTRACT

A substrate conveyor robot includes a guide rail cover arranged on a lateral side of the guide rail to cover an upper part of a guide rail that is exposed when an up-and-down mover moves downward. The base link includes the guide rail cover.

13 Claims, 7 Drawing Sheets

SUBSTRATE CONVEYOR ROBOT AND SUBSTRATE CONVEYING APPARATUS

TECHNICAL FIELD

The present disclosure relates to a substrate conveyor robot and a substrate conveying apparatus, in particular, to a substrate conveyor robot and a substrate conveying apparatus including an up-and-down driving mechanism configured to move a robot arm upward and downward.

BACKGROUND ART

Conventionally, a substrate conveyor robot and a substrate conveying apparatus including an up-and-down driving mechanism configured to move a robot arm upward and downward are known. Such a substrate conveyor robot is disclosed in Japanese Patent Laid-Open Publication No. JP 2017-148925, for example.

The Japanese Patent Laid-Open Publication No. JP 2017-148925 discloses a substrate conveyor robot (substrate conveying apparatus) including a robot arm, and an up-and-down driving mechanism configured to move the robot arm upward and downward. The up-and-down driving mechanism of this substrate conveyor robot includes a guide rail extending in an upward/downward direction, and an up-and-down mover configured to move upward and downward along the guide rail. In addition, the substrate conveyor robot includes a guide rail cover is configured to laterally cover an exposed upper part of the guide rail when the up-and-down mover moves downward. The guide rail cover is provided separately from a base link of the robot arm that can turn in a horizontal direction, and is arranged at a position facing the base link in the horizontal direction.

PRIOR ART

Patent Document

Patent Document 1: Japanese Patent Laid-Open Publication No. JP 2017-148925

SUMMARY OF THE INVENTION

However, in the substrate conveyor robot (substrate conveying apparatus) disclosed in the Japanese Patent Laid-Open Publication No. JP 2017-148925, the guide rail cover is provided separately from the base link of the robot arm that can turn in the horizontal direction, and is arranged at a position facing the base link in the horizontal direction. For this reason, it is conceivable that the guide rail cover may come in contact with the base link when the base link rotates so that a rotation range of the base link may be limited. Consequently, it is desired to provide a substrate conveyor robot and a substrate conveying apparatus capable of preventing a limit of a rotation range of a base link even in a case in which a guide rail cover is provided to cover an upper part of a guide rail.

The present disclosure is intended to solve the above problem, and one object of the present disclosure is to provide a substrate conveyor robot and a substrate conveying apparatus capable of preventing a limit of a rotation range of a base link even in a case in which a guide rail cover is provided to cover an upper part of a guide rail.

In order to attain the aforementioned object, a substrate conveyor robot according to a first aspect of the present disclosure includes a robot arm including a holder configured to hold a substrate and arranged in a free end of the robot arm; and an up-and-down driving mechanism configured to move the robot arm upward and downward, wherein the up-and-down driving mechanism includes a stationary part including a guide rail extending in an upward/downward direction, and an up-and-down mover movable upward and downward along the guide rail, the robot arm includes a base link connected to the up-and-down mover turnably in a horizontal direction, and a free-end side link connected to the base link turnably in the horizontal direction and including one or more arm parts having the free end, the substrate conveyor robot further comprises a guide rail cover arranged on a lateral side of the guide rail to cover an upper part of the guide rail that is exposed toward the lateral side when the up-and-down mover moves downward, and the base link includes the guide rail cover.

In the substrate conveyor robot according to the first aspect of the present disclosure, as stated above, the base link includes the guide rail cover. According to this configuration, because the guide rail cover turns integrally with the base link when the base link turns in a horizontal direction, interfere between the guide rail cover and the turning base link can be prevented. Therefore, it is possible to prevent a limit of a rotation range of the base link even in a case in which a guide rail cover is provided to cover an upper part of a guide rail.

In order to attain the aforementioned object, a substrate conveying apparatus according to a second aspect of the present disclosure includes a robot arm including a holder configured to hold a substrate and arranged in a free end of the robot arm; and an up-and-down driving mechanism configured to move the robot arm upward and downward, wherein the up-and-down driving mechanism includes a stationary part including a guide rail extending in an upward/downward direction, and an up-and-down mover movable upward and downward along the guide rail, the robot arm includes a base link connected to the up-and-down mover turnably in a horizontal direction, and a free-end side link connected to the base link turnably in the horizontal direction and including one or more arm parts having the free end, the substrate conveyor robot further comprises a guide rail cover arranged on a lateral side of the guide rail to cover an upper part of the guide rail that is exposed toward the lateral side when the up-and-down mover moves downward, and the base link includes the guide rail cover.

In the substrate conveyor robot according to the second aspect of the present disclosure, the guide rail cover is provided on the base link, as described above. According to this configuration, because the guide rail cover turns integrally with the base link when the base link turns in a horizontal direction, interfere between the guide rail cover and the turning base link can be prevented. Therefore, it is possible to provide a substrate conveying apparatus capable of preventing a limit of a rotation range of a base link even in a case in which a guide rail cover is provided to cover an upper part of a guide rail.

According to the present disclosure, as discussed above, it is possible to prevent a limit of a rotation range of a base link even in a case in which a guide rail cover is provided to cover an upper part of a guide rail.

MODES FOR CARRYING OUT THE INVENTION

Embodiments embodying the present disclosure will be described with reference to the drawings.

First Embodiment

The following description describes configurations of a substrate conveyor robot 100 and a substrate conveying apparatus 200 according to a first embodiment with reference to FIGS. 1 to 8.

Figure 1:
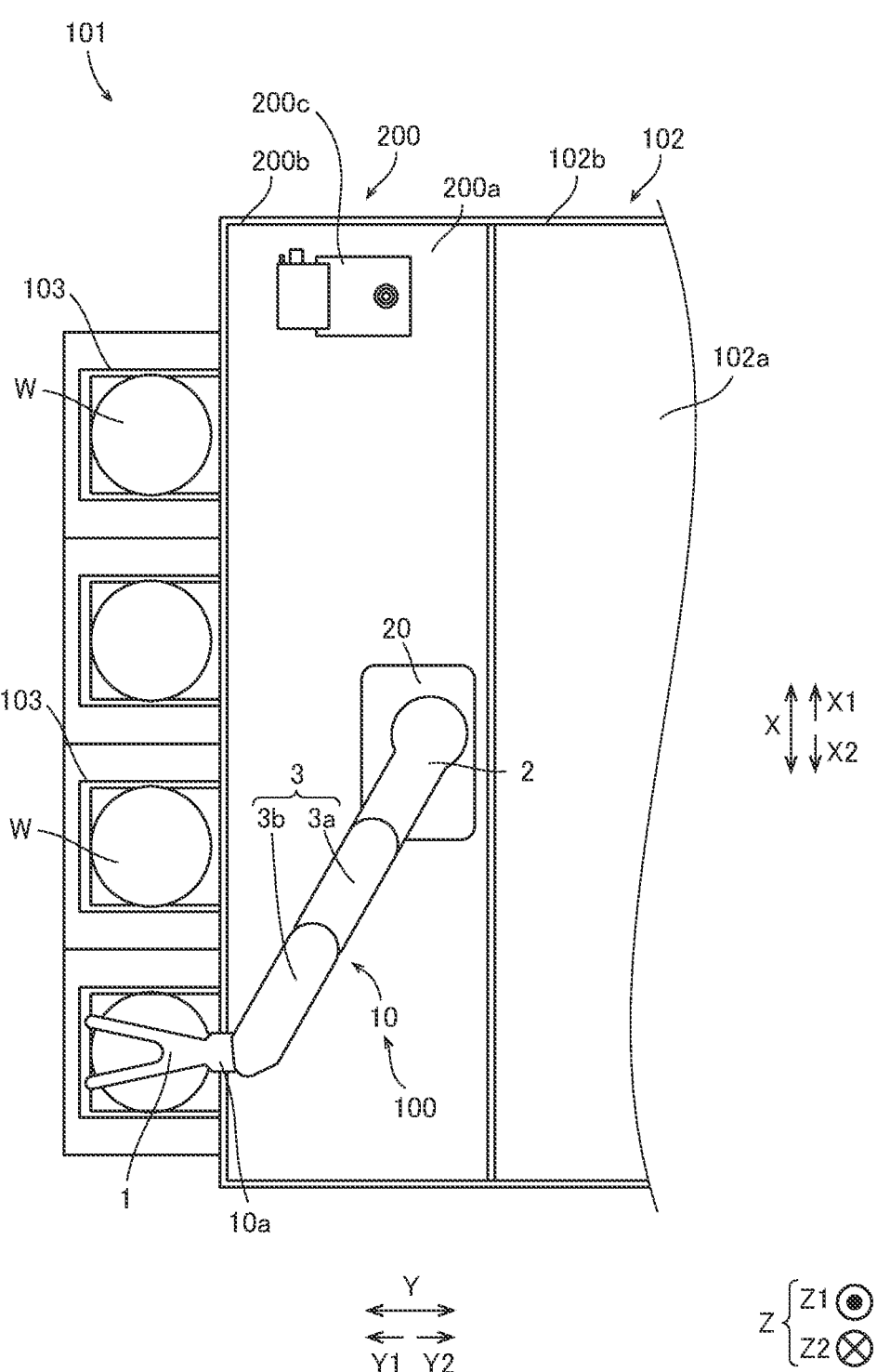
FIG. 1 is a plan view showing a semiconductor production apparatus including a substrate conveyor robot according to a first embodiment.

As shown in FIG. 1, the substrate conveyor robot 100 is used for a semiconductor production apparatus 101 installed in a clean room, for example. The semiconductor production apparatus 101 includes a wafer processing apparatus 102 configured to apply fabrication processes to a semiconductor wafer W, a FOUP 103 as a container for accommodating the wafers W, and a substrate conveying apparatus 200 configured to convey the wafer W between the wafer processing apparatus 102 and the FOUP 103. The substrate conveyor robot 100 is installed in the substrate conveying apparatus 200. The wafer W is an example of a "substrate" in the claims.

The FOUP 103 accommodates wafers W before or after the processes. The wafer processing apparatus 102 can apply the processes such as thermal process, impurity introduction process, thin-film formation process, lithography process, cleaning process, and planarization process to the wafer W.

The wafer processing apparatus 102 includes a processing space formation portion 102b for forming processing space 102a, a processing apparatus main unit (not shown) arranged in the forming processing space 102a configured to apply the processes to the wafer W, and a processing space adjusting device (not shown) configured to adjust an atmosphere gas with which the processing space 102a is filled.

The Substrate conveying apparatus 200 includes a preparation space formation portion 200b for forming preparations space 200a, a substrate conveyor robot 100 arranged in the preparations space 200a, and an aligner 200c arranged in the preparations space 200a and configured to adjust an orientation of the wafer W. Also, the substrate conveying apparatus 200 includes a preparation space adjusting device (not shown) configured to adjust an atmosphere gas with which the preparation space 200a is filled. The preparation space formation portion 200b is an example of a "robot compartment" in the claims.

The preparation space formation portion 200b is formed of a box having a rectangular parallelepiped. The substrate conveyor robot 100 is arranged in substantially central part of a longitudinal direction (X direction) of the preparation space 200a.

The substrate conveyor robot 100 is configured to temporarily convey the wafer W picked up from the FOUP 103 to the aligner 200c when the wafer W is conveyed to the wafer processing apparatus 102 from the FOUP 103. The substrate conveyor robot 100 inserts the wafer W whose orientation is adjusted by the aligner 200c into the wafer processing apparatus 102.

The substrate conveyor robot 100 is a SCARA-type horizontal multi-joint robot. The substrate conveyor robot 100 (substrate conveying apparatus 200) includes a robot arm 10, and an up-and-down driving mechanism 20 to which a base end of the robot arm 10 is connected. The up-and-down driving mechanism 20 is configured to move the robot arm 10 upward and downward.

A robot hand (end effector) configured to hold (grasp) the wafer W 1 is arranged in a free end 10a of the robot arm 10. Also, the robot arm 10 includes a base link 2 that is connected to an up-and-down mover 22 discussed later, and can turn in a horizontal direction. The base link 2 is arranged on an upper part of the movable-side casing 22a (see FIG. 4). The robot arm 10 includes a free-end side link 3 that is coupled to the base link 2, can turn in the horizontal direction, and includes one or more arm parts one of which includes the free end 10a. Specifically, the free-end side link 3 includes a first link 3a connected to the base link 2, and a second link 3b connected to the first link 3a and the robot hand 1. The robot hand 1 is an example of a "holder" in the claims. The first link 3a and second link 3b are an example of an "arm part" in the claims.

Figure 2:
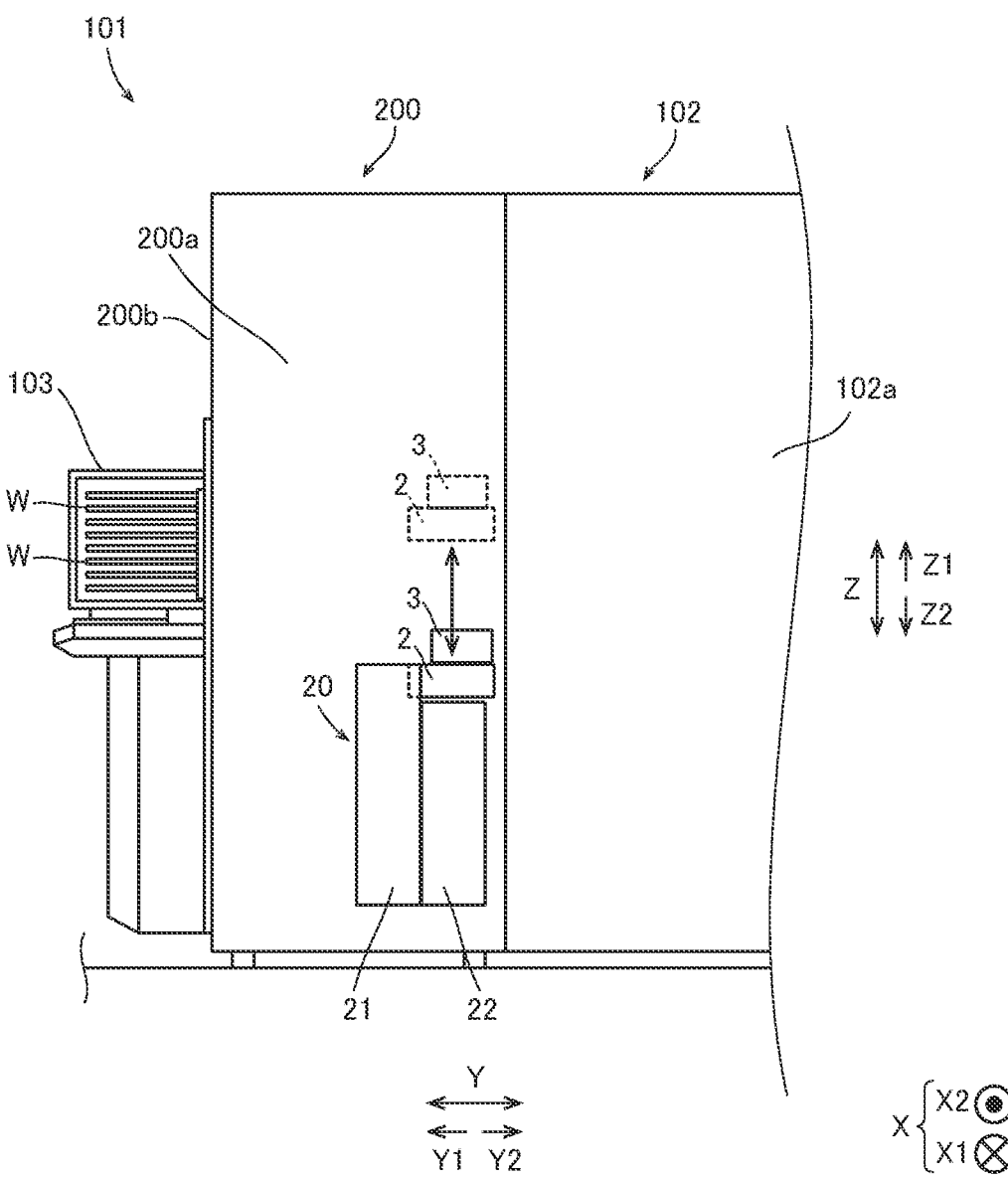
FIG. 2 is a schematic side view showing the semiconductor production apparatus including the substrate conveyor robot according to the first embodiment.

As shown in FIG. 2, the up-and-down driving mechanism 20 includes a stationary part 21 including guide rails 21a (see FIG. 3) extending in an upward/downward direction (Z direction). In addition, the up-and-down driving mechanism 20 includes an up-and-down mover 22 movable upward and downward along the guide rails 21a. In FIG. 2, the base link 2 and the free-end side link 3 that have moved upward are shown by dashed lines. Although the stationary part 21 and the up-and-down mover 22 are illustratively aligned in a Y direction in FIG. 2 as an exemplary arrangement, the present disclosure is not limited to this arrangement.

The up-and-down mover 22 has a cylindrical shape, and extends in the upward/downward direction. An upper part of the up-and-down mover 22 corresponds to an upper part of the up-and-down driving mechanism 20. When the up-and-down mover 22 moves up and down, a position of the robot hand 1 arranged in the free end 10a of the robot arm 10 is correspondingly moved up and down.

Figure 3:
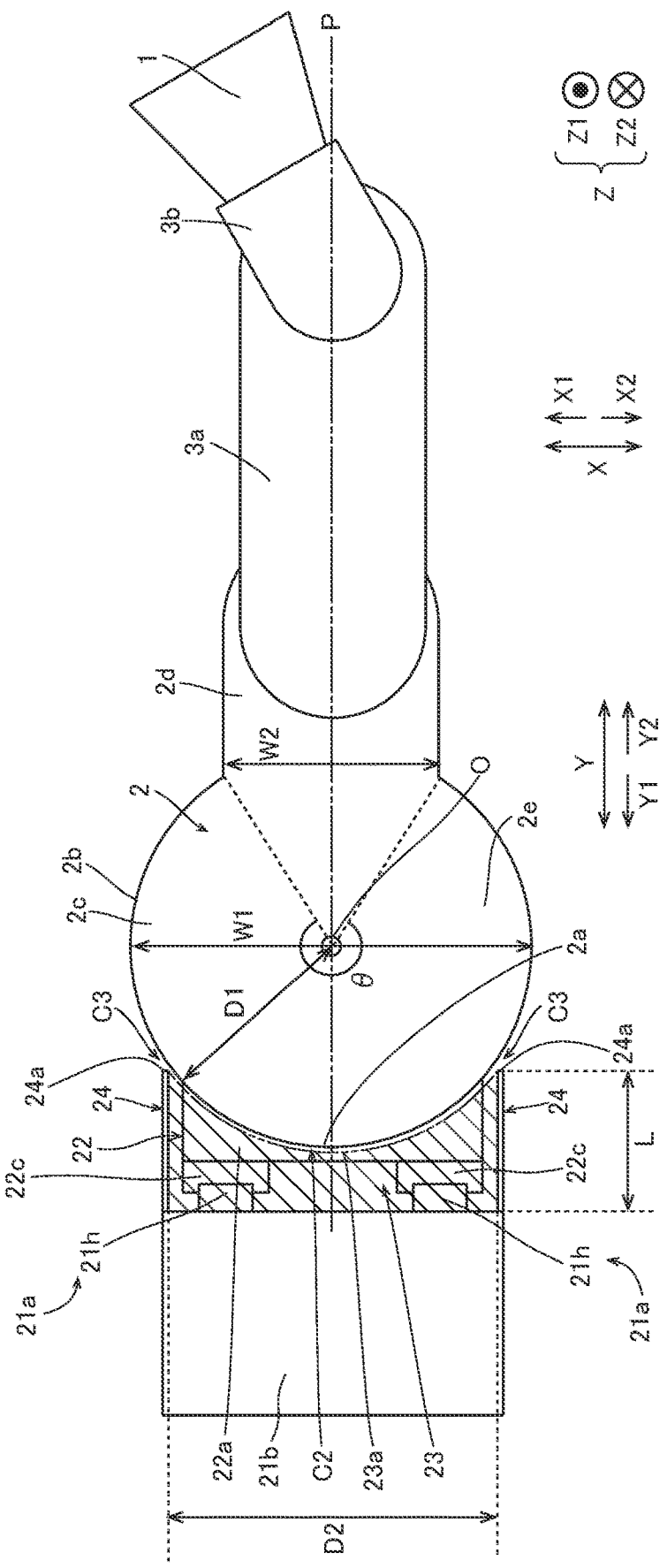
FIG. 3 is a plan view showing a base link (guide rail cover) according to the first embodiment.

As shown in FIG. 3, the stationary part 21 includes a stationary side casing 21b whose external shape is a substantially rectangular parallelepiped (see FIG. 4) elongated in the upward/downward direction (Z direction). In addition, two guide rails 21a are arranged in parallel to and spaced a predetermined interval away from each other in the stationary part 21 on a side where the up-and-down mover 22 is connected.

Figure 4:
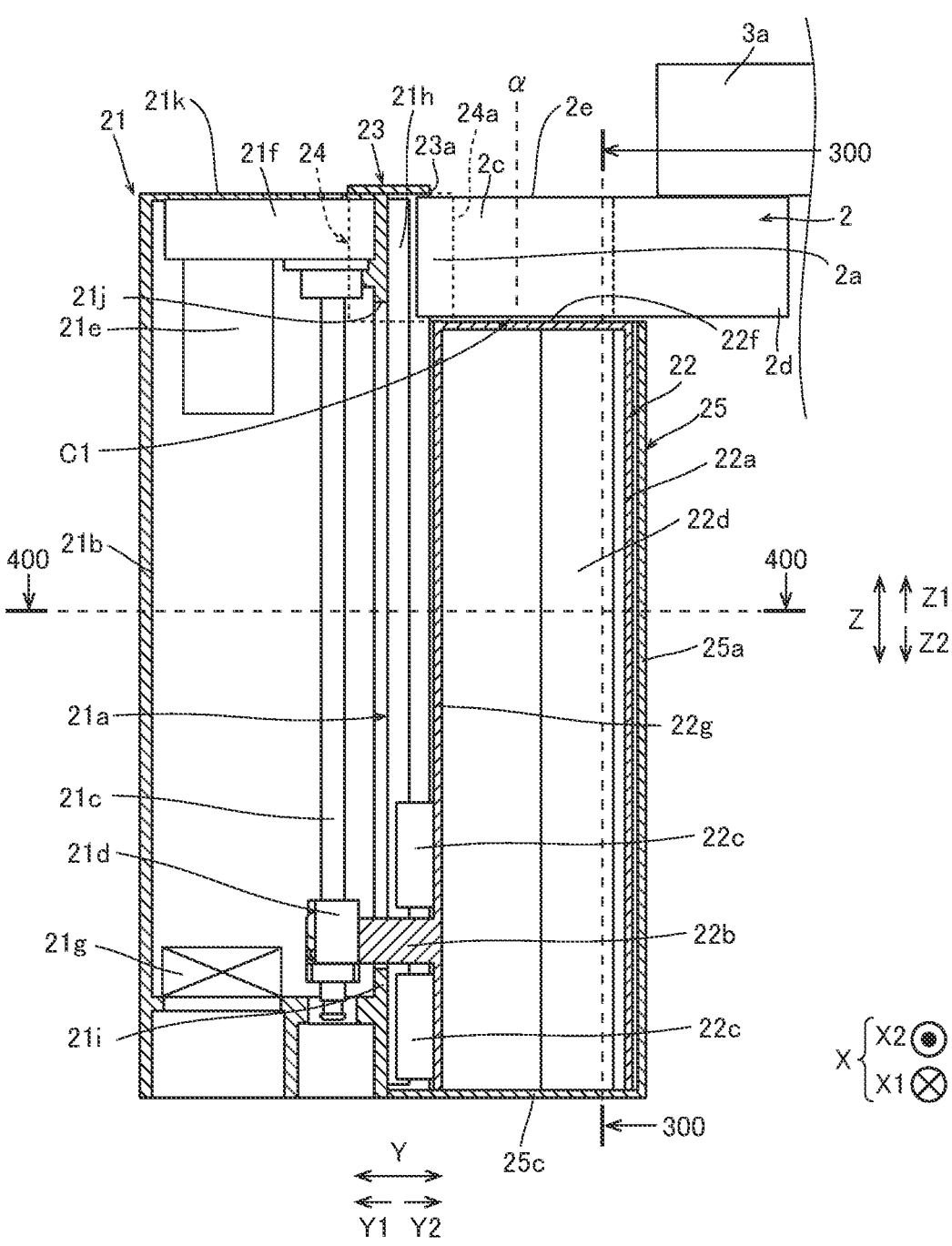
FIG. 4 is a cross-sectional view showing the base link (guide rail cover), a stationary part, and an up-and-down mover according to the first embodiment.
Figure 5:
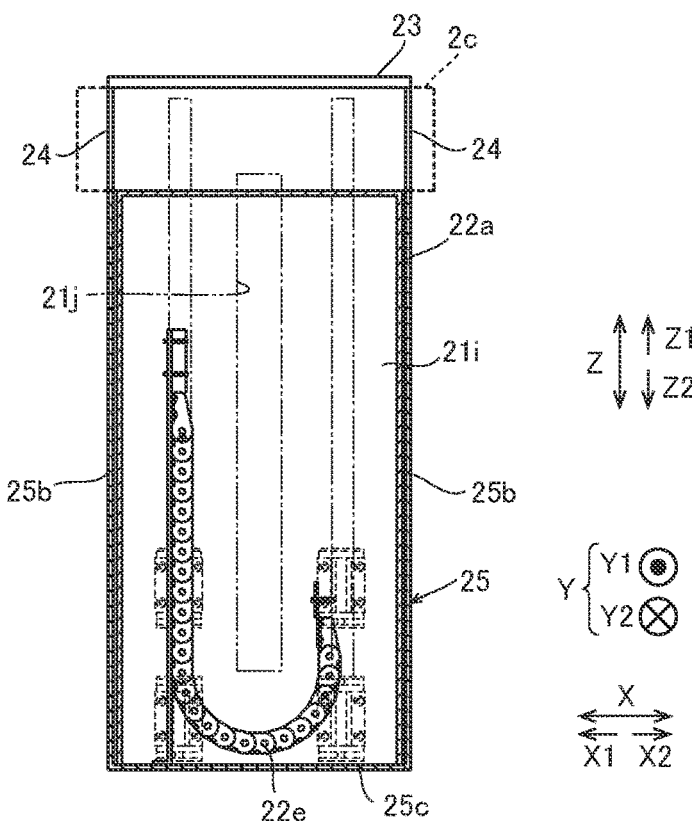
FIG. 5 is a cross-sectional view taken along a line 300-300 in FIG. 4.
Figure 6:
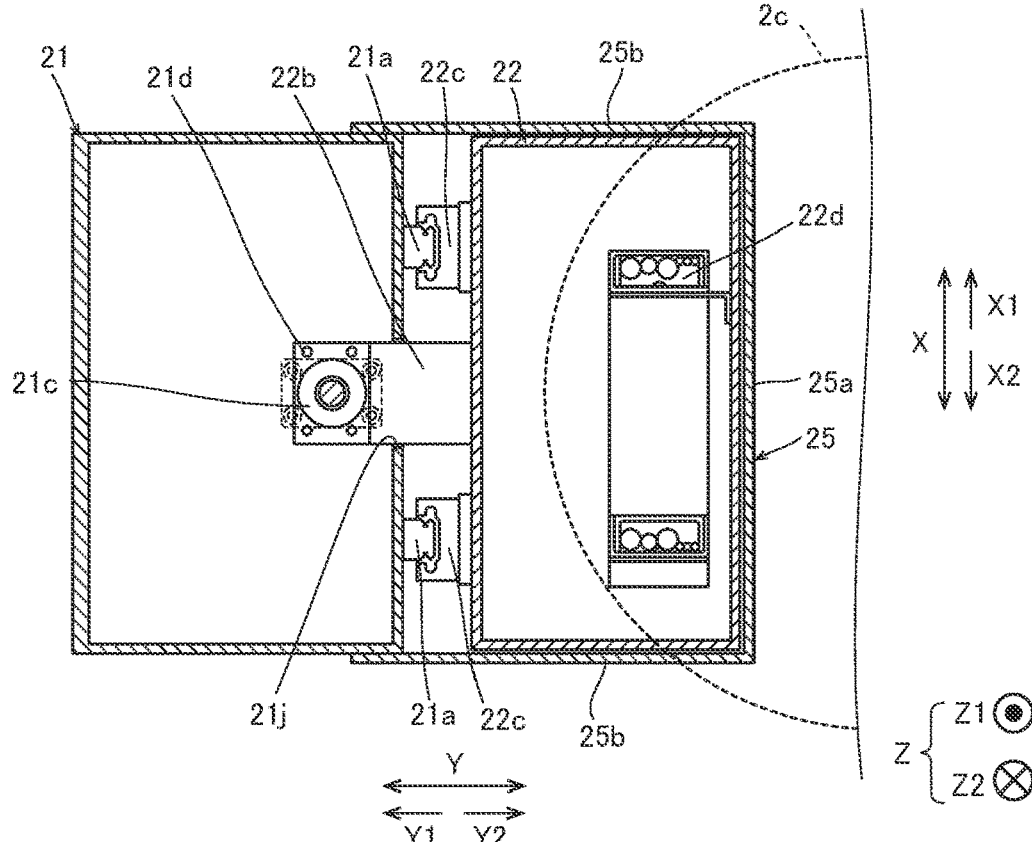
FIG. 6 is a cross-sectional view taken along a line 400-400 in FIG. 4.

As shown in FIG. 4, the up-and-down mover 22 includes a movable side casing 22a whose external shape is a substantially rectangular parallelepiped elongated in the upward/downward direction (Z direction). The movable side casing 22a is formed of metal plates forming a top surface and four side surfaces connected to each other, and has an opened bottom. The movable side casing 22a includes a support 22b connected to a nut member 21d discussed later in the stationary side casing 21b, and block-shaped movable bodies 22c engaging the guide rails 21a and movable upward and downward. Two movable bodies 22c are arranged in series in each of the two guide rails 21a for moving stability and reliability. In FIG. 4, the robot arm 10 is not sectionally shown but its outline is shown for ease of illustration.

A ball screw 21c configured to move the up-and-down mover 22 upward and downward, and the nut member 21d engaging the ball screw 21c to be moved upward and downward in response to rotation of the ball screw 21c are arranged in the stationary side casing 21b. Also, an electric motor 21e configured to rotatably drive the ball screw 21c, and a pulley mechanism 21f as a power transmission mechanism configured to transmit a driving force of the electric motor 21e to the ball screw 21c are arranged in the stationary side casing 21b. In addition, a fan 21g configured to produce a down air flow in an interior of the stationary side casing 21b is arranged in a lower part of the interior of the stationary side casing 21b. Accordingly, air inside the stationary side casing 21b can be discharged from the lower part to the outside.

As shown in FIG. 3, the substrate conveyor robot 100 includes a guide rail cover 2a arranged on a lateral side (on a Y2 side) of the guide rails 21a to cover upper parts 21h of the guide rails 21a that will be exposed in toward the lateral side (toward the Y2 side) when the up-and-down mover 22 moves downward (see FIG. 4).

The stationary side casing 21b includes a side wall 21i (see FIG. 5) connected to the up-and-down mover 22. The side wall 21i has an opening 21j (see FIG. 5) through which the support 22b passes. The support 22b is moved upward and downward with passing through the opening 21j. The opening 21j is an elongated opening having a length corresponding to the upward and downward movement of the up-and-down mover 22.

The movable side casing 22a has a cable routing area 22d (see FIG. 4) in which power supply and signal cables are routed to servomotors arranged in the base link 2 and the free-end side link 3. In addition, the movable side casing 22a includes a cable-route adjuster 22e (see FIG. 5) configured to adjust cable routing when the up-and-down mover 22 moves upward and downward.

As shown in FIG. 4, a height of a top surface 22f of the movable casing 22a is dimensioned so that a top surface 2e of the base link 2 substantially agrees with a height of a top surface 21k of the stationary side casing 21b when the robot arm 10 is in the lowest position.

In other words, the top surface 22f of the movable side casing 22a is positioned at a position lower by a height (thickness) of the base link 2 than the top surface 21k of the stationary side casing 21b when the up-and-down mover 22 has moved to the lowest position. The guide rail cover 2a, and a top cover 23 and a pair of side covers 24, which are discussed later, are provided to prevent exposure of the upper parts 21h of the guide rails 21a, which may bring dust particles, etc. into the preparation space 200a and contaminate the preparation space 200a with the dust particles, etc. when the up-and-down mover 22 moves to the lowest position.

In the first embodiment, the base link 2 includes the guide rail cover 2a as shown in FIG. 3. Specifically, the guide rail cover 2a is provided in the base link 2 by serving a housing 2b of the base link as the guide rail cover. More specifically, the guide rail cover 2a is a side part of the housing 2b of the base link 2. Accordingly, the guide rail cover 2a is rotated integrally with the base link 2 by rotation of the base link 2. A gap C1 (see FIG. 4) of approximately 1 to 2 mm is formed between the base link 2 (guide rail cover 2a) and the movable side casing 22a. According to this arrangement, the guide rail cover 2a can be smoothly rotated. The housing 2b is an example of a "first housing" in the claims.

Specifically, the base link 2 includes a circular part 2c having a circular shape as viewed from a top side, and an elongated part 2d coupled to the circular part 2c and extending toward a side opposite to the guide rail cover 2a. The guide rail cover 2a corresponds to the circular part 2c of the housing 2b.

That is, in the first embodiment, the guide rail cover 2a has an arc shape as viewed from the top side. Specifically, the guide rail cover 2a has an arc shape of a perfect circle (i.e., a segment of a circle).

In a direction (X direction in FIG. 3) orthogonal to an extension direction of the elongated part 2d, the maximum width W1 of the circular part 2c (i.e., diameter of the perfect circle) is greater than the maximum width W2 of the elongated part 2d.

In the first embodiment, the arc shape of the guide rail cover 2a is a part of a circle centering a rotation axis α (see FIG. 4) of the base link 2 as viewed from the top side. Accordingly, a distance D1 between a rotation center O of the guide rail cover 2a and the guide rail cover 2a can be a constant distance D1 (radius of the circle) irrespective of parts of the guide rail cover 2a as viewed from the top side. The distance D1 is ½ of the maximum value of the width W1 of the circular part 2c. The rotation axis α of the base link 2 agrees with a rotation center O of the guide rail cover 2a as viewed from the top side. That is, the base link 2 rotates about the rotation center O.

In the first embodiment, the arc shape of the guide rail cover 2a has a central angle θ greater than 180 degrees. Specifically, the center angle θ of the guide rail cover 2a is approximately 270 degrees. Accordingly, the rotation center O of the guide rail cover 2a is surrounded by the guide rail cover 2a as viewed from the top side.

The substrate conveyor robot 100 includes the top cover 23 (shaded part in FIG. 3) arranged on a top side (Z2 side) of the upper parts 21h of the guide rails 21a to cover the upper parts 21h of the guide rails 21a. The top cover 23 is arranged on the stationary part 21. The top cover 23 is arranged in proximity to the guide rail cover 2a as viewed from the top side. Specifically, the top cover 23 is arranged so that an edge 23a of the top cover does not overlap the guide rail cover 2a as viewed from the top side.

In the first embodiment, the edge 23a of the top cover 23 on a guide rail cover 12a side of the top cover has an arc shape corresponding to the arc shape of the guide rail cover 2a as viewed from the top side. Specifically, the edge 23a of the top cover 23 and the guide rail cover 2a have an arc shape corresponding to parts of circles having the same curvature and the same radius as each other as viewed from the top side.

In the first embodiment, the guide rail cover 2a is configured to rotate while keeping a gap C2 between the guide rail cover and the edge 23a of the top cover 23 constant as viewed from the top side. That is, the edge 23a of the top cover 23 has an arc shape that is curved along (parallel to)

the guide rail cover 2a as viewed from the top side. The gap C2 is, for example, approximately 1 to 2 mm. In a case in which the gap C2 is relatively small, a negative pressure can be kept in the stationary side casing 21b. As a result, it is possible to prevent a leak of impurities such as grease (oil), etc. of the robot arm 10 from the stationary side casing 21b. The aforementioned grease, etc. is discharged through an exhaust vent (hole), which is not illustrated, on a floor surface of the clean room by a downward flow produced by the fan 21g arranged in the stationary side casing 21b. Also, because the gap C2 is relatively small, dust particles, etc. can be prevented from entering the stationary side casing 21b through the gap C2.

In addition, the substrate conveyor robot 100 includes a pair of side covers 24 arranged so that the upper parts 21h of the guide rails 21a are interposed in a lateral direction (in the X direction) between the side covers. The pair of side covers 24 extend in the Y direction as viewed from the top side (orthogonal to the X direction as viewed from the top side). Lengths of the pair of side covers 24 in the Y direction are the same size (length L) as each other. The pair of side covers 24 are arranged on the stationary part 21.

In the first embodiment, rotation centers as the rotation center O of the base link 2 and the guide rail cover 2a are positioned at a position P corresponding to a center of the pair of side covers 24 in a direction in which the pair of side covers 24 face each other (X direction). The rotation center O is positioned outside of an area between the pair of side covers 24 in the Y direction as viewed from the top side.

In the first embodiment, the guide rail cover 2a is configured to rotate while keeping a gap C3 between the guide rail cover 2a and the edge 24a of each of the pair of side covers 24 on the guide rail cover 2a side constant as viewed from the top side. For example, the gap C3 is approximately 1 to 2 mm similar to the gap C2. Accordingly, a negative pressure can be more reliably kept in the stationary side casing 21b, and dust particles, etc. can be more reliably prevented from entering the stationary side casing 21b through the gap C3.

In the first embodiment, the guide rail cover 2a, which has the arc shape, is configured to rotate with at least a part of the arc shape (circular part 2c) being located in an area between the pair of side covers 24 as viewed from the top side. Specifically, at least a part of the arc shape (circular part 2c) of the guide rail cover 2a (base link 2) is located in the aforementioned area so that the gap C3 between the guide rail cover 2a and the edge 24a of each of the pair of side covers 24 is a predetermined value (e.g., 1 to 2 mm). In addition, a distance D2 between the pair of side covers 24 in the X direction is smaller than the maximum value of the width W1 of the circular part 2c.

Also, as shown in FIG. 4, the stationary side casing 21b includes a stationary side cover 25 including a side surface 25a configured to cover the movable side casing 22a from the Y1 side when the up-and-down mover 22 moves to the lowest position, a pair of side surfaces 25b (see FIGS. 5 and 6) configured to cover the movable side casing 22a from the X1 side and the X2 side when the up-and-down mover 22 moves to the lowest position, and a bottom surface 25c. The side surface 25a, the pair of side surface 25b and the bottom surface 25c are formed integrally with each other. The stationary side casing 21b and the stationary side cover 25 make up parts of a covering means for covering the up-and-down driving mechanism 20.

Figure 7:
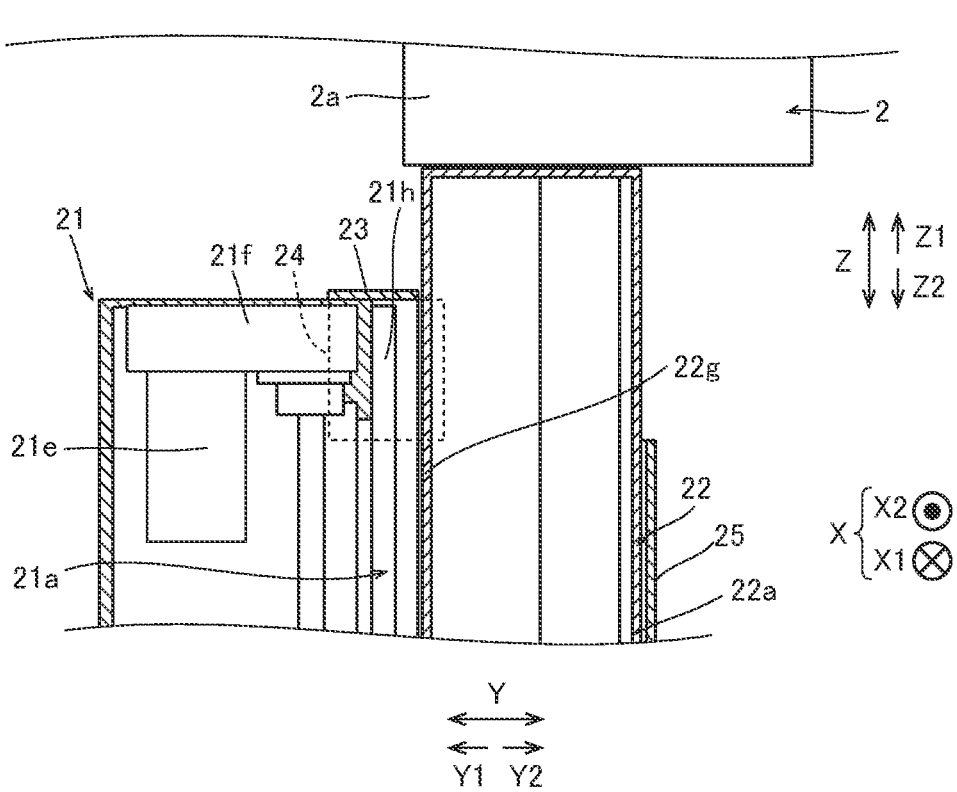
FIG. 7 is a cross-sectional view showing the base link (guide rail cover), the stationary part, and the up-and-down mover according to the first embodiment when the up-and-down mover moves upward.

As shown in FIG. 7, a top of the stationary side cover 25 is opened so that the movable side casing 22a can move into and out of the stationary side cover. The guide rails 21a are hermetically enclosed in space mainly formed by the guide rail cover 2a, a front surface 22g (connection side surface connected to the stationary part 21) of the movable side casing 22a, the top cover 23 and the pair of side covers 24 when the up-and-down mover 22 is located in a lower side (see FIG. 4). Also, the guide rails 21a are hermetically enclosed in space mainly formed by the front surface 22g of the movable side casing 22a, the stationary side cover 25, the top cover 23 and the pair of side covers 24 when the up-and-down mover 22 moves upward and located in an upper side.

Accordingly, surfaces of the guide rails 21a are not exposed over the entire upward and downward stroke of the up-and-down mover 22. As a result, it is possible to maintain a clean atmosphere in the preparation space 200a.

Figure 8:
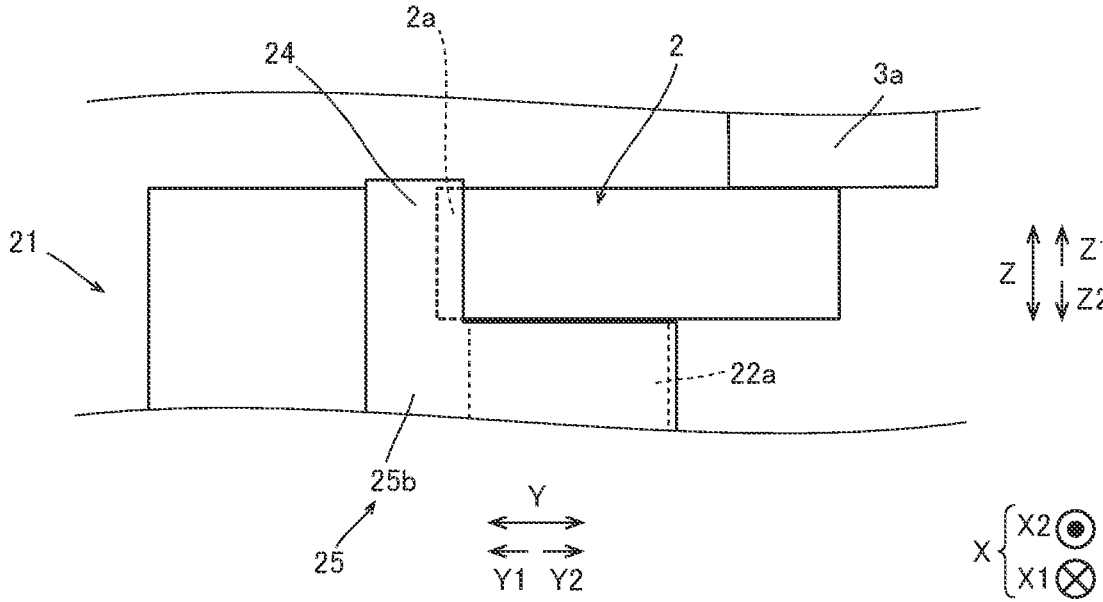
FIG. 8 is a side view showing the base link (guide rail cover), the stationary part, and the up-and-down mover according to the first embodiment.

As shown in FIG. 8, the pair of side covers 24 and the stationary side cover 25 (side surfaces 25b) are constructed integrally with each other.

Advantages of First Embodiment

In the first embodiment, the following advantages are obtained.

In the first embodiment, as discussed above, the base link 2 includes the guide rail cover 2a in the substrate conveyor robot 100. According to this configuration, because the guide rail cover 2a turns integrally with the base link 2 when the base link 2 turns in a horizontal direction, interfere between the guide rail cover 2a and the turning base 2 link can be prevented. As a result, the range of rotation of the base link 2 can be prevented from being limited if a guide rail cover 2a that covers the upper part 21h of the guide rails 21a is provided.

In the first embodiment, as discussed above, the guide rail cover 2a is provided in the base link 2 (the first housing) by serving a housing 2b of the base link as the guide rail cover. According to this configuration, because the guide rail cover 2a is a part of of the base link 2, interfere between the guide rail cover 2a and the turning base link 2 can be reliably prevented. Also, because the guide rail cover 2a is the housing 2b itself, the number of part can be reduced as compared with a case in which a separate cover is attached to the housing, and as a result a structure of base link 2 can be simplified.

In the first embodiment, as discussed above, the guide rail cover 2a has an arc shape as viewed from the top side. Accordingly, both end parts of the guide rail cover 2a can be positioned closer to the rotation center O of the guide rail cover 2a as compared with a case in which the guide rail cover 2a has a liner shape as viewed from the top side. As a result, it is easily possible to prevent interfere between the both end parts of the guide rail cover 2a and other parts that are located around the guide rail cover 2a (for example, the pair of side covers 24) when the guide rail cover 2a rotates. Consequently, the guide rail cover 2a can be easily arranged in proximity to the aforementioned parts.

In the first embodiment, as discussed above, the arc shape of the guide rail cover 2a is a part of a circle centering a rotation axis α of the base link 2 as viewed from the top side. Accordingly, the distance D1 between the guide rail cover 2a and the aforementioned rotation axis α (rotation center O) as viewed from the top side can be kept constant irrespective of parts of the guide rail cover 2a. Consequently, gaps (C2, C3) between the guide rail cover 2a and other parts that are located around the guide rail cover 2a (for example, the top cover 23 and the pair of side covers 24) can be kept constant irrespective of rotational directions of the guide rail cover 2a.

In the first embodiment, as discussed above, the substrate conveyor robot 100 includes the top cover 23 arranged on the stationary part 21 to cover the upper parts 21h of the guide rails 21a from the top side. Accordingly, the top cover 23 can prevent that dust particles, etc. enter space that accommodates the guide rails 21a (stationary side casing 21b) from the top side. In addition, the edge 23a of the top cover 23 on a guide rail cover 2a side of the top cover has an arc shape corresponding to the arc shape of the guide rail cover 2a as viewed from the top side. As a result, the gap C2 between the top cover 23 and the guide rail cover 2a can be easily reduced. Consequently, when space that accommodates the guide rails 21a (stationary side casing 21b) is brought in a negative pressure by the fan 21g, a negative pressure can be easily kept in the aforementioned space, while dust particles, etc. can be prevented from entering the aforementioned space through the gap between the top cover 23 and the guide rail cover 2a.

In the first embodiment, as discussed above, the edge 23a of the top cover 23 has the arc shape corresponding to the arc shape of the guide rail cover, and the guide rail cover 2a the arc shape of the guide rail cover have the arc shape as viewed from the top side. In addition, the guide rail cover 2a is configured to rotate while keeping the gap C2 between the guide rail cover and the edge 23a of the top cover 23 constant as viewed from the top side. Accordingly, because the gap C2 is kept constant, a pressure in space that accommodates the guide rails 21a (stationary side casing 21b) can be kept constant.

In the first embodiment, as discussed above, the substrate conveyor robot 100 includes a pair of side covers 24 arranged on the stationary part 21 so that the upper parts 21h of the guide rails 21a are interposed between the side covers arranged on lateral sides of the guide rails 21a. In addition, rotation centers as the rotation center O of the base link 2 and the guide rail cover 2a are positioned at a position corresponding to a center of the pair of side covers 24 in a direction in which the pair of side covers 24 face each other. Accordingly, the gaps C3 between the guide rail cover 2a and the pair of side covers 24 can be the same as each other. As a result, it is possible to prevent pressures on one side cover 24 side and another side cover 24 side from becoming uneven in space that accommodates the guide rails 21a (stationary side casing 21b). Also, because the distances between the pair of side covers 24 and the rotation center O are the same as each other, the gaps C3 between the guide rail cover 2a and the pair of side covers 24 can be set the same as each other without setting lengths L of the pair of side covers 24 different from each other. Consequently, because the same type side covers can be used for both the side covers 24, increase of the number of types of parts can be prevented.

In the first embodiment, as discussed above, the guide rail cover 2a has the arc shape as viewed from the top side, and is configured to rotate while keeping a gap C3 between the guide rail cover and an edge 24a of each side cover 24 on a guide rail cover 2a side of the side cover constant as viewed from the top side. Accordingly, because the gap C3 is kept constant, a pressure in space that accommodates the guide rails 21a (stationary side casing 21b) can be more reliably kept constant.

In the first embodiment, as discussed above, the guide rail cover 2a, which has the arc shape, is configured to rotate with at least a part of the arc shape being located in an area between the pair of side covers 24 as viewed from the top side. Accordingly, the guide rail cover 2a can be arranged close to a pair of side cover 24 sides, the gaps C3 between the pair of side covers 24 and the guide rail cover 2a can be easily reduced.

In the first embodiment, as discussed above, the arc shape of the guide rail cover 2a has a central angle θ greater than 180 degrees. Accordingly, a length (circumference as viewed from the top side) of the guide rail cover 2a can be long as compared with a case in which the central angle θ is not greater than 180 degrees. As a result, an area covered by the guide rail cover 2a in rotation of the base link 2 can be increased. Consequently, even in a case in which a rotation angle of the guide rail cover 2a (base link 2) is large, the guide rail cover 2a can easily cover the upper parts 21h of the guide rails 21a.

In the first embodiment, as discussed above, the base link 2 includes the guide rail cover 2a in the substrate conveying apparatus 200. According to this configuration, because the guide rail cover 2a turns integrally with the base link 2 when the base link 2 turns in a horizontal direction, interfere between the guide rail cover 2a and the turning base 2 link can be prevented. Therefore, it is possible to provide a substrate conveying apparatus 200 capable of preventing a limit of a rotation range of a base link 2 even in a case in which a guide rail cover 2a is provided to cover an upper part 21h of a guide rail 21a.

Second Embodiment

Figure 9:
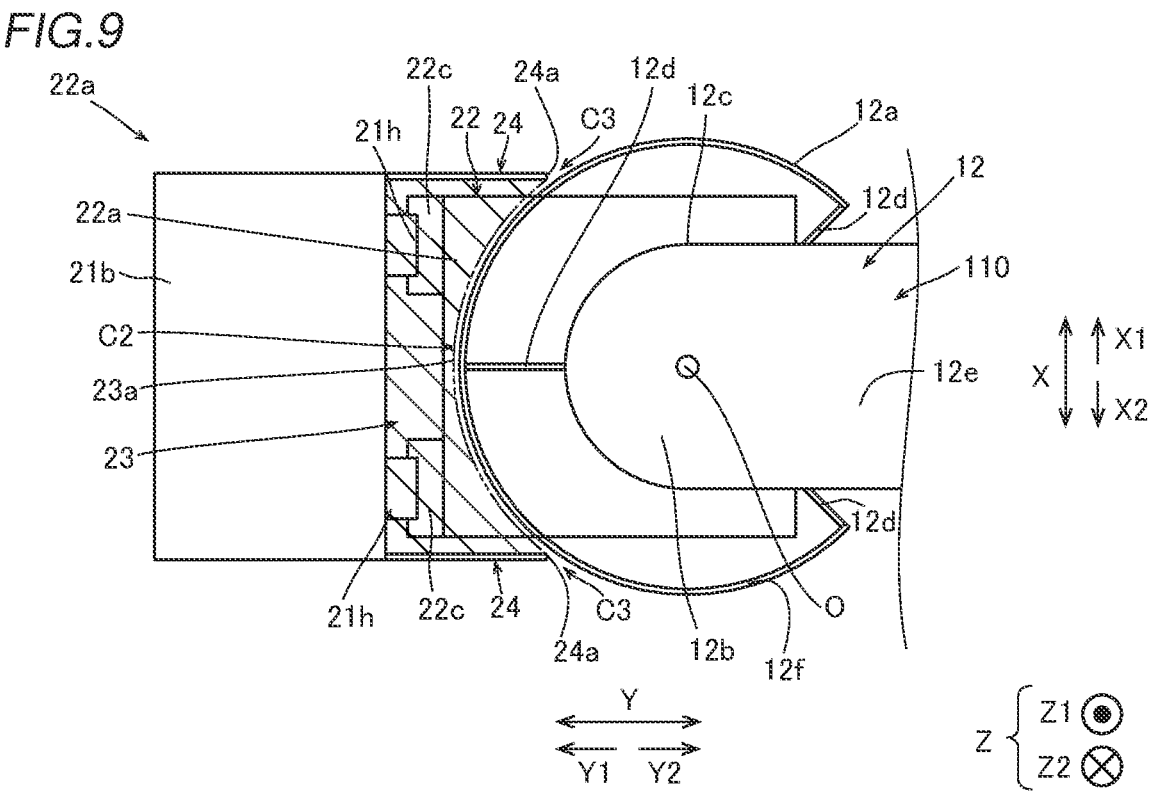
FIG. 9 is a plan view showing the base link and the guide rail cover according to the second embodiment.
Figure 10:
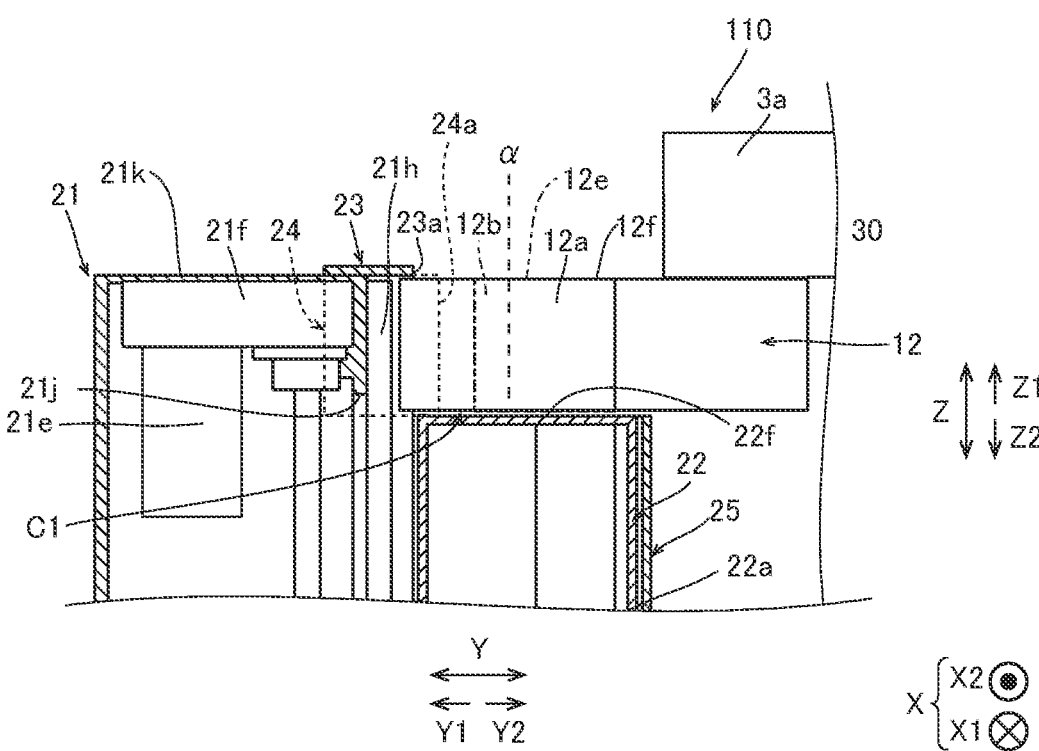
FIG. 10 is a cross-sectional view showing a base link (guide rail cover), a stationary part, and an up-and-down mover according to a second embodiment.

The following description describes configurations of a substrate conveyor robot 500 and a substrate conveying apparatus 600 according to a second embodiment with reference to FIGS. 9 and 10. In the substrate conveyor robot 500 and the substrate conveying apparatus 600, the guide rail cover 12a is attached to the base link 12 dissimilar to the aforementioned first embodiment in which the housing 2b of the base link 2 includes the guide rail cover 2a. The same configurations as those of the first embodiment are denoted by the same reference numerals, and their description is omitted.

As shown in FIG. 9, the robot arm 110 includes a base link 12 connected to the up-and-down mover 22 and turnable in a horizontal direction.

The substrate conveyor robot 500 (board transport device 600) includes a guide rail cover 12a that is arranged on a lateral side (Y2 side) of the guide rails 21a to cover the upper parts 21h of the guide rails 21a, which will be exposed toward the lateral side (toward the Y2 side) when the up-and-down mover 22 moves downward. The guide rail cover 12a is formed of a metal plate, for example.

In the second embodiment, the guide rail cover 12a is constructed integrally with the base link 12 by attaching the guide rail cover to the base link 12. Specifically, the guide rail cover 12a is fixed to the base link 12 so as not to move relative to the base link 12. In other words, the guide rail cover 12a is provided separately from the base link 12 and can turn integrally with the base link 12.

The guide rail cover 12a covers (encloses) an end part 12b of the base link 12 as viewed from the top side. Although the end part 12b of the base link 12 illustratively has arc shape as one example as viewed from the top side in FIG. 9, the end part may have other shape (for example, a rectangular shape) other than the arc shape of the base link 12.

In the second embodiment, the guide rail cover 12a is connected to the housing 12c of the base link 12 by connection parts 12d. Specifically, as viewed from the top side, the connection parts 12*d* extend in a straight line between the housing 12*c* of the base link 12 and the guide rail cover 12*a*. That is, the guide rail cover 12*a* and the base link 12 are spaced away from each other. The connection parts 12*d* are fixed to the housing 12*c* of the base link 12 and the guide rail cover 12*a* by means of screws or welding, for example. The housing 12*c* of the base link 12 is formed of metal such as aluminum, for example. The housing 12*c* is an example of a "second housing" in the claims.

A plurality of connection parts are provided as the connection parts 12*d*. For example, ends of the guide rail cover 12*a* and a center of the guide rail cover 12*a* as viewed from the top side are connected to the housing 12*c* of the base link 12 by the plurality of connection parts 12*d* (i.e., three connection parts 12*d*). One or a number of, other than three, the connection parts 12*d* may be provided.

As shown in FIG. 10, a height of the top surface 22*f* of the movable casing 22*a* is dimensioned so that a top surface 12*e* of the base link 12 and a top surface 12*f* of the guide rail cover 12*a* substantially agree with a height of a top surface 21*k* of the stationary side casing 21*b* when the robot arm 110 is in the lowest position. In FIG. 10, the robot arm 110 is not sectionally shown but its outline is shown for ease of illustration.

The other configuration of the second embodiment is similar to the first embodiment.

Advantages of Second Embodiment

In the second embodiment, the following advantages are obtained.

In the second embodiment, as discussed above, the guide rail cover 12*a* is constructed together with the base link 12 by attaching the guide rail cover to the base link 12. According to this configuration, because the guide rail cover 12*a* rotates integrally with the base link 12, interfere between the guide rail cover 12*a* and the turning base link 12 can be prevented. Also, dissimilar to a case in which the base link 12 itself serves as the guide rail cover, a shape of the base link 12 can be prevented from becoming complicated.

In the second embodiment, as discussed above, the guide rail cover 12*a* is provided separately from the base link 12 and turnable integrally with the base link 12, and is connected to the housing 12*c* (second housing) of the base link 12 by the connection parts 12*d*. Accordingly, the guide rail cover 12*a* and the base link 12 can be easily constructed integrally with each other by the connection parts 12*d*.

The other advantages of the second embodiment are similar to the first embodiment.

Modified Embodiment

Note that the embodiment disclosed this time must be considered as illustrative in all points and not restrictive. The scope of the present invention is not shown by the above description of the embodiments but by the scope of claims for patent, and all modifications or modified examples within the meaning and scope equivalent to the scope of claims for patent are further included.

While the example in which the guide rail cover (2*a*, 12*a*) has an arc shape as viewed from the top side has been shown in the aforementioned first and second embodiments, the present disclosure is not limited to this. The guide rail cover (2*a*, 12*a*) may have a shape other than an arc shape (a segment of a circle) as viewed from the top side (for example, a flat plate shape linearly extends as viewed from the top side).

While the example in which the arc shape of the guide rail cover (2*a*, 12*a*) is a part of a circle centering a rotation axis α of the base link (2, 12) as viewed from the top side has been shown in the aforementioned first and second embodiments, the present disclosure is not limited to this. For example, the guide rail cover (2*a*, 12*a*) may have an arc shape centering a rotation axis, which disagrees with the rotation axis α as viewed from the top side.

While the example in which the gap C2 between the edge 23*a* of the top cover 23 and the guide rail cover (2*a*, 12*a*) is kept constant has been shown in the aforementioned first and second embodiments, the present disclosure is not limited to this. The gap C2 may vary in accordance with rotation of the guide rail cover (2*a*, 12*a*) in a rotational direction.

While the example in which rotation centers as the rotation center O of the base link (2, 12) and the guide rail cover (2*a*, 12*a*) are positioned at a position corresponding to a center of the pair of side covers 24 has been shown in the aforementioned first and second embodiments, the present disclosure is not limited to this. The rotation center O may be positioned close to one of the pair of side covers 24. In this case, it is preferable that a length of one side cover 24 that is arranged closer to the rotation center O as viewed from the top side is shorter than a length of another side cover 24 that is arranged away from the rotation center O as viewed from the top side. Accordingly, even in a case in which the rotation center O is positioned close to one of the pair of side covers 24, the gaps C3 between the guide rail cover (2*a*, 12*a*) and the pair of side covers 24 can be the same as each other.

While the example in which the gap C3 between the pair of side covers 24 and the guide rail cover (2*a*, 12*a*) is kept constant has been shown in the aforementioned first and second embodiments, the present disclosure is not limited to this. The gap C3 may vary in accordance with rotation of the guide rail cover (2*a*, 12*a*) in a rotational direction.

While the example in which at least a part of the arc shape of the guide rail cover 2*a* is located in an area between the pair of side covers 24 as viewed from the top side has been shown in the aforementioned first and second embodiments, the present disclosure is not limited to this. The guide rail cover (2*a*, 12*a*) may be located entirely outside the aforementioned area.

While the example in which the arc shape of the guide rail cover (2*a*, 12*a*) has a central angle θ greater than 180 degrees has been shown in the aforementioned first and second embodiments, the present disclosure is not limited to this. The center angle θ of the guide rail cover (2*a*, 12*a*) may not greater than 180 degrees.

While the example in which the free-end side link 3 includes two links (first link 3*a* and second link 3*b*) has been shown in the aforementioned first and second embodiments, the present disclosure is not limited to this. For example, the free-end side link 3 may include three or more links.

While the example in which the guide rail cover 12*a* is connected to the housing 12*c* (second housing) of the base link 12 by connection parts 12*d* has been shown in the aforementioned second embodiment, the present disclosure is not limited to this. For example, the guide rail cover 12*a* may be provided separately from the housing 12*c* of the base link 12 and be directly attached to the housing 12*c*. In this case, for example, the guide rail cover 12*a* may be attached to the housing 12*c* by adhesive, etc., or the guide rail cover 12*a* may be connected to the housing 12*c* by fitting.

DESCRIPTION OF REFERENCE NUMERALS

1: robot hand (holder)
2, 12: base link
2*a*, 12*a*: guide rail cover
2*b*: housing (first housing)
3: free-end side link
3*a*: first link (arm part)
3*b*: second link (arm part)
10: robot arm
10*a*: free end
12*c*: housing (second housing)
20: up-and-down driving mechanism
21: stationary part
21*a*: guide rail
21*h*: upper part
22: up-and-down mover
23: top cover
23*a*: edge (edge of top cover)
24: side cover
24*a*: edge (edge of side cover)
100, 500: substrate conveyor robot
200, 600: substrate conveying apparatus
200*b*: preparation space formation portion (robot compartment)
C1: gap (gap between edge of top cover and guide rail cover)
C2: gap (gap between edge of side cover and guide rail cover)
W: wafer (substrate)
α: rotation axis
θ: central angle
The invention claimed is:

1. A substrate conveyor robot comprising:
a robot arm including a holder configured to hold a substrate and arranged in a free end of the robot arm; and
an up-and-down driving mechanism configured to move the robot arm upward and downward, wherein
the up-and-down driving mechanism includes a stationary part including a guide rail extending in an upward/downward direction, and an up-and-down mover movable upward and downward along the guide rail,
the robot arm includes a base link connected to the up-and-down mover turnably in a horizontal direction, and a free-end side link connected to the base link turnably in the horizontal direction and including one or more arm parts having the free end,
the substrate conveyor robot further comprises a guide rail cover arranged on a lateral side of the guide rail to cover an upper part of the guide rail that is exposed toward the lateral side when the up-and-down mover moves downward, and
the base link includes the guide rail cover.

2. The substrate conveyor robot according to claim 1, wherein the guide rail cover is included in the base link by serving a first housing of the base link as the guide rail cover or by attaching the guide rail cover to the base link.

3. The substrate conveyor robot according to claim 1, wherein the guide rail cover has an arc shape as viewed from a top side.

4. The substrate conveyor robot according to claim 3, wherein the arc shape of the guide rail cover is a part of a circle centering a rotation axis of the base link as viewed from the top side.

5. The substrate conveyor robot according to claim 3 further comprising a top cover included in the stationary part and arranged on a top side of the upper part of the guide rail to cover the upper part of the guide rail, wherein
an edge of the top cover on a guide rail cover side of the top cover has an arc shape corresponding to the arc shape of the guide rail cover as viewed from the top side.

6. The substrate conveyor robot according to claim 5, wherein
the edge of the top cover has the arc shape corresponding to the arc shape of the guide rail cover, and the guide rail cover has the arc shape of the guide rail cover as viewed from the top side; and
the guide rail cover is configured to rotate while keeping a gap between the guide rail cover and the edge of the top cover constant as viewed from the top side.

7. The substrate conveyor robot according to claim 3 further comprising a pair of side covers included in the stationary part with the upper part of the guide rail being interposed between the side covers arranged on lateral sides of the guide rail; and
rotation centers of the base link and the guide rail cover are positioned at a position corresponding to a center of the pair of side covers in a direction in which the pair of side covers face each other.

8. The substrate conveyor robot according to claim 7, wherein the guide rail cover has the arc shape as viewed from the top side, and is configured to rotate while keeping a gap between the guide rail cover and an edge of each side cover on a guide rail cover side of the side cover constant as viewed from the top side.

9. The substrate conveyor robot according to claim 7, wherein the guide rail cover, which has the arc shape, is configured to rotate with at least a part of the arc shape being located in an area between the pair of side covers as viewed from the top side.

10. The substrate conveyor robot according to claim 3, wherein the arc shape of the guide rail cover has a central angle greater than 180 degrees.

11. The substrate conveyor robot according to claim 2, wherein the guide rail cover is provided separately from the base link and turnable integrally with the base link, and is connected to a second housing of the base link by a connection part.

12. The substrate conveyor robot according to claim 1 further comprising a top cover included in the stationary part and arranged on a top side of the upper part of the guide rail to cover the upper part of the guide rail.

13. A substrate conveying apparatus comprising:
a substrate conveyor robot including a robot arm including a holder configured to hold a substrate and arranged in a free end of the robot arm, and an up-and-down driving mechanism configured to move the robot arm upward and downward; and
a robot compartment configured to accommodate the substrate conveyor robot, wherein
the up-and-down driving mechanism includes a stationary part including a guide rail extending in an upward/downward direction, and an up-and-down mover movable upward and downward along the guide rail,
the robot arm includes a base link connected to the up-and-down mover turnably in a horizontal direction, and a free-end side link connected to the base link turnably in the horizontal direction and including one or more arm parts having the free end,
the substrate conveyor robot further comprises a guide rail cover arranged on a lateral side of the guide rail to cover an upper part of the guide rail that is exposed toward the lateral side when the up-and-down mover moves downward, and the base link includes the guide rail cover.

\* \* \* \* \*